(12) United States Patent
Proefrock et al.

(10) Patent No.: US 7,231,532 B2
(45) Date of Patent: Jun. 12, 2007

(54) GENERATING NOTIFICATIONS BY POWERED-DOWN DEVICES

(75) Inventors: Wayne L. Proefrock, Hillsboro, OR (US); Paul S. Diefenbaugh, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 10/676,894

(22) Filed: Sep. 30, 2003

(65) Prior Publication Data

US 2005/0068858 A1    Mar. 31, 2005

(51) Int. Cl.
*G06F 1/32* (2006.01)
(52) U.S. Cl. ...................... 713/323; 713/324
(58) Field of Classification Search ............... 713/300, 713/320, 322–324
See application file for complete search history.

(56) References Cited

U.S. PATENT DOCUMENTS 5,659,762 A * 8/1997 Sawada et al. ............. 713/323
6,043,950 A * 3/2000 Kim .......................... 360/73.03
6,567,876 B1 * 5/2003 Stufflebeam ................ 710/303
2002/0120879 A1 * 8/2002 Atkinson ..................... 713/323
2003/0163746 A1 * 8/2003 Lee ............................ 713/320

OTHER PUBLICATIONS

McFerrin, B. (Editor), "T10/1545D: Information Technology—Multimedia Commands—4 (MMC-4)" Revision 1d, InterNational Committee for Information Technology Standards (INCITS), pp. i-iv, 155-166 (Sep. 3, 2002).

* cited by examiner

*Primary Examiner*—Dennis M. Butler
(74) *Attorney, Agent, or Firm*—Alan Pederson-Giles

(57) ABSTRACT

An optical drive may include drive electronics and wake circuitry. The drive electronics may be arranged to operate the optical drive when in a powered mode. The wake circuitry may be arranged to generate a wake signal when the drive electronics are in an unpowered mode and when a button is pushed on the optical drive or optical media is inserted into the drive. An interface to the optical drive may include a line to carry the wake signal from the wake circuitry. A host may house the optical drive and communicate with optical drive via the interface.

19 Claims, 3 Drawing Sheets

GENERATING NOTIFICATIONS BY POWERED-DOWN DEVICES

BACKGROUND

The claimed invention relates to devices in mobile computers and, more particularly, to communication with devices in mobile computers.

Notebook (or "laptop") computers may include one or more devices that may be built-in and/or removable from an expansion bay or similar housing. Such devices may be somewhat modular and may interact with the remainder of the notebook computer via an interface, such as the parallel advanced technology attachment (PATA) interface. Examples of such devices may include optical media drives, other types of removable-media devices, and/or communication devices.

For devices in which media may be inserted, an operating system in the notebook computer may periodically poll the device to determine whether a state of the media has been changed (e.g., media inserted, ejected, etc.). Such ongoing polling of the device, however, may in some instances prevent the device from being placed in a lower-power mode (e.g., powered down/off). This polling operation and corresponding device state may consume more power than the lower-power mode.

BRIEF DESCRIPTION OF THE DRAWINGS

The accompanying drawings, which are incorporated in and constitute a part of this specification, illustrate one or more implementations consistent with the principles of the invention and, together with the description, explain such implementation(s). In the drawings.

DETAILED DESCRIPTION

The following detailed description refers to the accompanying drawings. The same reference numbers may be used in different drawings to identify the same or similar elements. Also, the following detailed description illustrates certain implementations and principles, but the scope of the claimed invention is defined by the appended claims and equivalents.

Exemplary System

Figure 1:
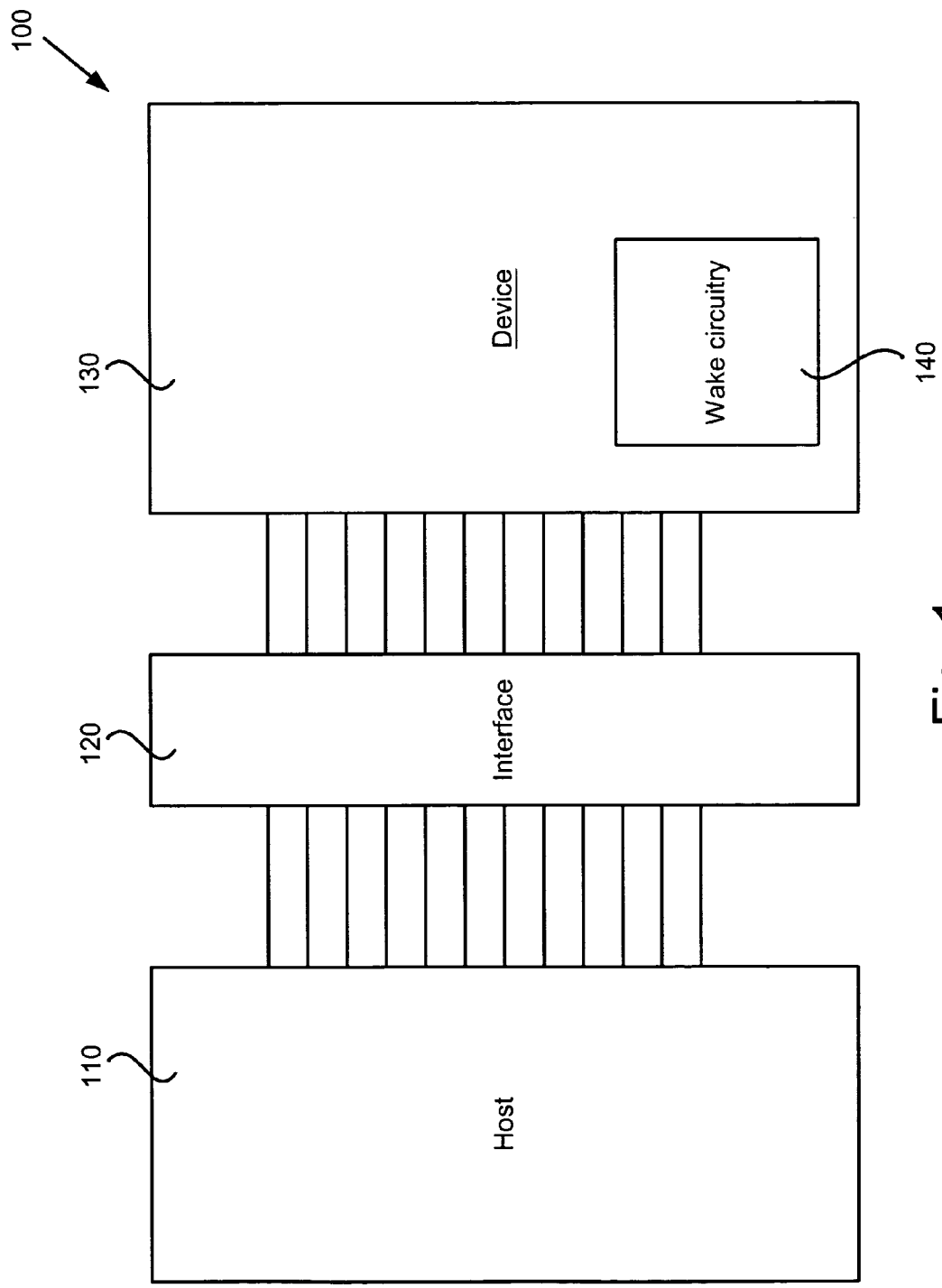
FIG. 1 illustrates an exemplary system consistent with the principles of the invention.

FIG. 1 illustrates an exemplary computing system 100 in an implementation consistent with the principles of the invention. System 100 may include a host 110, an interface 120, and a device 130 that includes wake circuitry 140. It should be noted that FIG. 1 illustrates electrical connections, and that one or more of interface 120 and device 130 may be physically located within host 110.

Host 110 may include a notebook computer or other mobile computing device. Although not explicitly illustrated in FIG. 1, host 110 may include a number of components typically found in mobile computing devices, such as a battery, a processor, memory, a hard disk, a flat panel display, an antenna, etc. Host 110 may be arranged to provide control signals and power to device 130 via interface 120. When host 110 controls the operation of device 130, such control may be accomplished via computer-executable instructions stored in a memory (not shown) in host 110.

Interface 120 may include one or more physical connectors that include pins/lines (hereinafter "lines" that denote the signals assigned to particular pins). Such lines in interface 120 are typically predefined and standardized/fixed by common convention so that host 110 may support a number of different devices 130, perhaps from different manufacturers. In one implementation consistent with the principles of the invention, interface 120 may include a parallel ATA (PATA) interface. Such PATA interface may include a number of well-defined lines with which those skilled in the art will be familiar, including a power line (VCC), an interrupt request line (IRQ), and a reset line (RESET).

Device 130 may send and receive data to/from host 110 via interface 120, and device 130 may also receive power and control signals via interface 120. Purely for clarity of explanation, device 130 will be described herein in the context of an optical drive (e.g., compact disc (CD), CD with CD writing capabilities, digital versatile disc (DVD), DVD with DVD writing capabilities, etc.). In some implementations, device 130 may be placed in a "D3 Cold" state in which minimal power is used by device 130. For the purposes of description, such a D3 Cold state may be equated with an un-powered state for device 130.

Wake circuitry 140 may reside within device 130 and may be arranged to wake device 130 upon a media-related state change in (un-powered) device 130. Because device 130 may not be receiving power from interface 120 in a D3 Cold state, wake circuitry 140 may operate in conjunction with existing lines on interface 120. In one implementation consistent with the principles of the invention, wake circuitry 140 may trigger the IRQ line of interface 120, but other implementations are possible. One specific implementation of wake circuitry 140 will be described with respect to FIG. 2.

Figure 2:
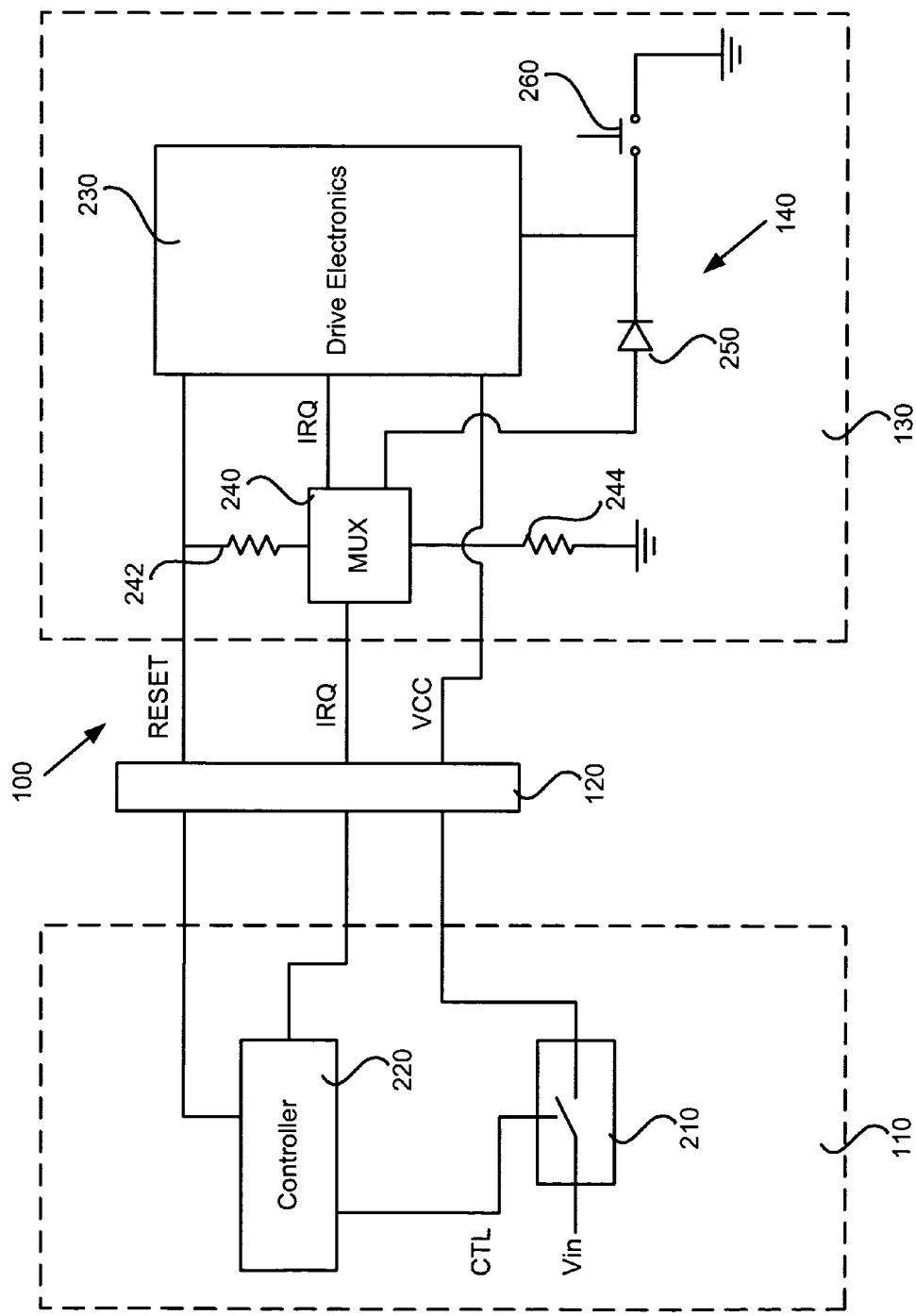
FIG. 2 illustrates the exemplary system of FIG. 1 according to an implementation consistent with the principles of the invention.

FIG. 2 illustrates in greater detail one implementation of exemplary system 100 consistent with the principles of the invention. Host 110 may include a power switch 210 and a controller 220. Power switch 210 may include, for example, a field effect transistor (FET) arranged to selectively provide a supply voltage Vin to the VCC line of interface 120 based on a control signal CTL. In this manner, power switch 210 may selectively remove at least power on the VCC line from device 130 under direction of controller 220.

Controller 220 may be arranged to monitor, control, and interface with device 130. Although illustrated as a discrete device in FIG. 2, controller 220 may be implemented, for example, in software that is stored in a memory and executed by a general-purpose or specific-purpose processor (not shown). Although controller 220 may be connected to other lines of interface 120, it may be connected to the IRQ and RESET lines, and it may control power on the VCC line via power switch 210. The operation of controller 220 will be described in greater detail below.

Interface 120 may include a number of lines, including RESET, IRQ, and VCC shown in FIG. 2. Although not explicitly illustrated in FIG. 2, host 110 may include a number of pull-up resistors (not shown) to impart a default High state (e.g., +5 V) to certain lines in interface 120. For example, the RESET and IRQ lines may normally be held in a High logical state be such pull-up resistors.

Device 130 may include wake-up circuitry 140 and drive electronics 230. In one implementation consistent with the principles of the invention, wake-up circuitry 140 may include a multiplexer (MUX) 240, resistors 242 and 244, a diode 250, and a switch 260.

Drive electronics 230 may include necessary hardware and/or firmware to operate device 130, including controlling a motor if present and sending/receiving data to/from host 110. During typical operation, drive electronics 230 may operate device 130 and consume power, but in a power-saving mode drive electronics 230 may be substantially unpowered by the removal of voltage from the VCC line of interface 120.

MUX 240 may determine which of drive electronics 230 and diode 250 is connected to the IRQ line in interface 120. Resistors 242 and 244 may power and/or bias MUX 240 so that diode 250 is connected to the IRQ line in interface 120 when drive electronics 230 is unpowered (e.g., in a D3 Cold state). Conversely, when drive electronics 230 is fully powered, MUX 240 may instead connect the IRQ signal from drive electronics 230 directly to interface 120.

Diode 250 and switch 260 may operate in conjunction to pull the IRQ line in interface 120 to a Low logical state when switch 260 is actuated. Such pulling-down of the existing IRQ line may generate an interrupt transition and act to alert one or more of controller 220 and drive electronics 230 that a state change has occurred in unpowered device 130. Controller 220 and/or drive electronics 230 may perform additional functions in response to this interrupt signal on the IRQ line of interface 120, as will be described in detail below.

Switch 260 may be actuated by a state change event in device 130. If, for example, device 130 is a tray-loading optical drive, switch 260 may be actuated by a user pressing a manual eject button on the drive or by insertion of media into the drive. If device 130 is a slot-loading optical drive, switch 260 may be actuated by the insertion of optical media into the drive or another media insertion/removal event. In other implementations consistent with the principles of the invention, switch 260 may be actuated by a user pressing some other type of button/control on device 130, such as a media play button, pause button, forward/reverse button, track skip button, etc.

In one implementation, switch 260 may include two or more such switches in parallel, so that the activation of any switch may generate an interrupt on the IRQ line of interface 120. In some implementations consistent with the principles of the invention, switch 260 and/or drive electronics 230 may include an associated memory function (e.g., a flip-flop, "sticky" switch, etc. (not shown)) so that switch 260 and/or drive electronics 230 may be queried later (e.g., by controller 220) to determine exactly which state change event in device 130 caused the interrupt on the IRQ line.

It should be noted that MUX 240 and resistors 242/244 need not be present for wake-up circuitry 140 to pull down and cause an interrupt signal on the IRQ line of interface 120. Further, those skilled in the art will appreciate that other circuitry may be used in place of and/or in addition to diode 250 and switch 260 to cause a signal on the IRQ line when drive electronics 230 are unpowered.

Exemplary Process

Figure 3:
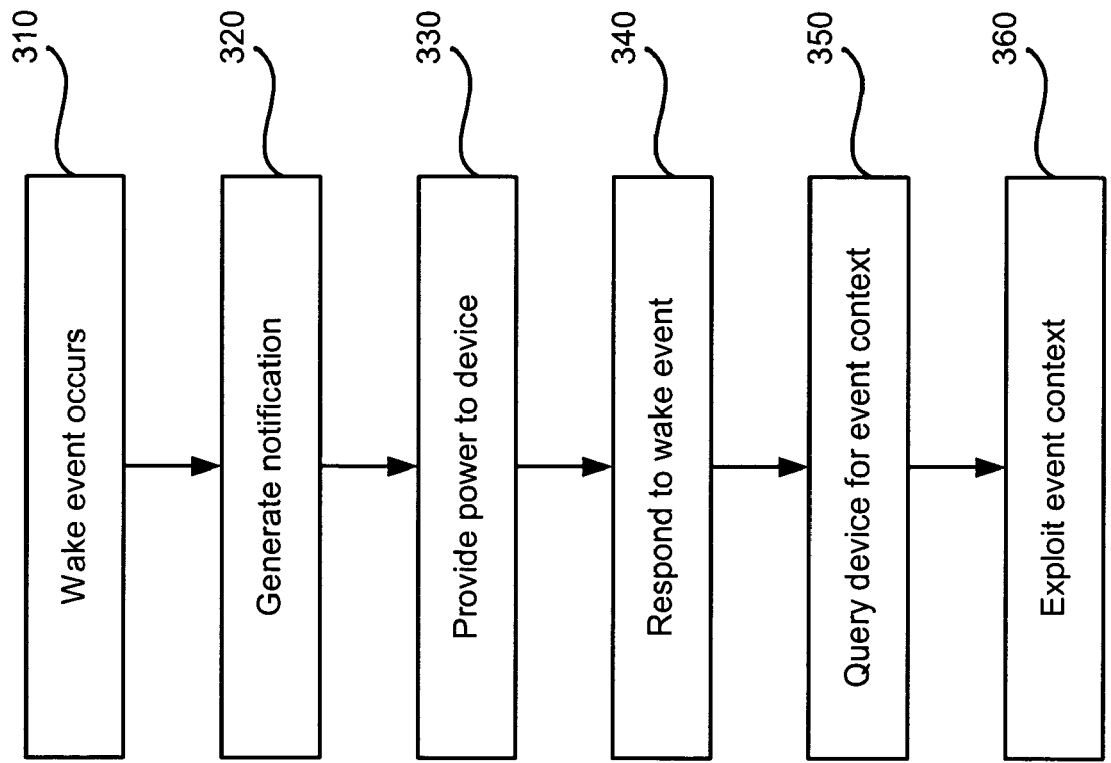
FIG. 3 is a flow chart illustrating a process of waking a device upon a state change according to an implementation consistent with the principles of the invention.

FIG. 3 is a flow chart illustrating a process of waking device 130 upon a state change according to an implementation consistent with the principles of the invention. The process may begin by some wake event occurring [act 310]. As mentioned earlier, possible state changes that may wave device 130 may include a push of an eject button and/or media insertion.

The wake event may actuate wake circuitry 140 in device 130 and generate a notification to host 110 [act 320]. Such a notification may include a down-transition of the IRQ line in interface 120 caused by diode 250 and switch 260. Other lines in interface than the IRQ line and/or other arrangements of wake circuitry 140, however, may be employed to notify host 110. As illustrated in FIG. 2, this notification signal may also be input to drive electronics 230 in device 130.

Processing may continue with one of host 110 and drive circuitry 230 providing power to device 130 [act 330]. In the implementation illustrated in FIG. 2, for example, upon receipt of an interrupt on IRQ line, controller 220 may send a CTL signal to power switch 210 to re-connect the Vin voltage to device 130 via the VCC line in interface 120. In another implementation, where drive circuitry 230 may have internally disconnected the VCC line, drive circuitry 230 may re-connect such power to other portions of device 130.

Device 130, having power re-connected, may then respond to the wake event [act 340]. In one, tray-loading, implementation, device 130 may open its tray (e.g., ejecting optical media therein) in response to an eject button push in act 310. In another, slot-loading, implementation, device 130 may accept optical media onto an internal spindle in response to insertion of the media in act 310. Other responses by device 130 are possible in act 340, depending on the particular wake event in act 310.

In response to the notification in act 320, host 110 may query device 130 for the context of the wake event [act 350]. For example, controller 220 may have received an interrupt signal on the IRQ line, but may not know exactly which state change event in device 130 caused the interrupt. So controller 220 may reset device 130 and may query the event context via interface 120. Device 130 may respond to host 110 via interface 120 after determining what event closed switch 260. Drive electronics 230 may query the memory function (e.g., flip-flop or other mechanism) associated with switch 260 to aid in this determination.

Processing may continue with host 110 exploiting the context of the wake event that it received from device 130 [act 360]. In one implementation, controller 220 in host 110 may inform an operating system that media has been ejected from device 130. In another implementation, controller 220 may inform the operating system that media has been inserted into device 130. Other wake event contexts may be similarly communicated to, for example, the operating system of the mobile computer. The operating system may reflect this wake event accordingly, for example, reflecting the media's presence/absence in a graphical representation of a file system.

The system and scheme described above may lower the power consumption of device 130 when idle. Polling of device 130 by host 110 may also be reduced or eliminated, due to the operation of at least wake circuitry 140.

CONCLUSION

The foregoing description of one or more implementations consistent with the principles of the invention provides illustration and description, but is not intended to be exhaustive or to limit the claimed invention to the precise form disclosed. Modifications and variations are possible in light of the above teachings or may be acquired from practice of the invention.

For example, although the above waking scheme has been described with respect to the IRQ line of interface 120, another line of interface 120 may additionally or alternately be used. Although the use of the IRQ line uses an existing, predefined line of interface 120 (an hence does not impose substantial design restrictions), an unassigned or reassigned line of interface 120 may also be used for dedicated, wake event signaling from device 130 to host 110.

Further, although described above in the context of mobile or notebook computers, the principles of the invention described herein also may be implemented in a desktop computer, tower computer, or other non-mobile computing system.

Moreover, the acts in FIG. 3 need not be implemented in the order shown; nor do all of the acts necessarily need to be performed. Also, those acts that are not dependent on other acts may be performed in parallel with the other acts. Further, the acts in this figure may be implemented as instructions, or groups of instructions, implemented in a computer-readable medium.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the claimed invention is defined by the claims and their equivalents.

What is claimed:

1. A device, comprising:
   a parallel advanced technology attachment interface including a plurality of predefined lines;
   drive circuitry capable of being maintained in an unpowered state; and
   wake circuitry to provide a notification signal on an interrupt request line of the plurality of predefined lines in response to an action of a user when the drive circuitry is in the unpowered state.

2. The device of claim 1, wherein the one predefined line is an interrupt line.

3. The device of claim 1, wherein the wake circuitry includes:
   a switch actuatable by the action of the user and coupled between the one predefined line and a reference voltage.

4. The device of claim 1, wherein the wake circuitry further includes:
   a diode connected between the switch and the one predefined line.

5. The device of claim 1, further comprising:
   an optical drive mechanism to receive or eject an optical disc,
   wherein the drive circuitry is capable of providing power to the optical drive mechanism in response to the notification signal.

6. The device of claim 5, wherein the action of the user includes an attempt to insert the optical disc into the drive mechanism or to eject the optical disc from the drive mechanism.

7. A method of waking an optical drive, comprising:
   generating a notification in response to a wake event;
   providing power to the optical drive;
   responding to the wake event by the optical drive;
   querying the optical drive for a context of the wake event; and
   receiving the context of the wake event from the optical drive.

8. The method of claim 7, wherein the generating includes:
   changing a logical state of an interface line based on a user performing the wake event.

9. The method of claim 7, wherein the wake event includes pushing a button on the optical drive or inserting optical media into the optical drive.

10. The method of claim 7, wherein the providing includes:
    connecting a voltage to a power line in an interface to the optical drive.

11. The method of claim 7, wherein the responding includes:
    ejecting a tray of the optical drive or loading optical media into the optical drive.

12. The method of claim 7, further comprising:
    communicating the context of the wake event to an operating system.

13. A system, comprising:
    an optical drive, including:
       drive electronics to operate the optical drive when not in an unpowered mode, and
       wake circuitry to generate a wake signal when the drive electronics are in the unpowered mode and when a button is pushed on the optical drive or optical media is inserted into the drive;
    an interface including a line to carry the wake signal from the wake circuitry;
    a host to house the optical drive and communicate with optical drive via the interface; and
    an antenna proximate the host,
    wherein the interface includes a parallel advanced technology attachment interface, and the line includes an interrupt request line.

14. The system of claim 13, wherein the wake circuitry includes:
    a diode connected to the line in the interface, and
    a switch connected between the diode and a reference voltage, the switch actuatable when one of the button is pushed on the optical drive and optical media is inserted into the drive.

15. The system of claim 13, wherein the host includes:
    a power switch to selectively provide power to the drive electronics in the optical drive via the interface.

16. The system of claim 15, wherein the host further includes:
    a controller to actuate the power switch when the wake signal is received from the wake circuitry via the interface.

17. An article of manufacture, comprising:
    a storage medium having instructions stored thereon that, when executed by a computing platform, result in waking an optical drive by:
       providing power to the optical drive in response to a received wake notification;
       querying the optical drive for a context of the received wake notification; and
       exploiting the context of the received wake notifications,
    wherein the exploiting includes:
       relaying the context of the received wake notification to an operating system.

18. The article of manufacture of claim 17, wherein the providing includes:
    instructing a power switch to close in response to the received notification.

19. The article of manufacture of claim 18, wherein the received notification is an interrupt signal.

* * * * *